United States Patent [19]

Sandoz et al.

[11] Patent Number: 5,337,585
[45] Date of Patent: Aug. 16, 1994

[54] METHOD FOR PRODUCING AN OPTICAL FIBER

[75] Inventors: Frédéric Sandoz, Cortaillod; Hervé Berthou, Saint-Aubin, both of Switzerland

[73] Assignee: Cabloptic S.A., Switzerland

[21] Appl. No.: 971,753

[22] PCT Filed: Jun. 4, 1992

[86] PCT No.: PCT/CH92/00108
§ 371 Date: Jan. 26, 1993
§ 102(e) Date: Jan. 26, 1993

[87] PCT Pub. No.: WO92/21629
PCT Pub. Date: Dec. 10, 1992

[30] Foreign Application Priority Data

Jun. 5, 1991 [FR] France .................... 91 06908

[51] Int. Cl.⁵ ............................ C03B 37/023
[52] U.S. Cl. .......................... 65/391; 65/412; 65/416
[58] Field of Search .................. 65/3.11, 3.12, 13

[56] References Cited

U.S. PATENT DOCUMENTS

| | | | |
|---|---|---|---|
| Re. 28,029 | 6/1974 | Keck et al. | 65/3.12 |
| 4,975,102 | 12/1990 | Edahiro et al. | 65/3.12 |
| 5,067,975 | 11/1991 | Backer et al. | 65/3.12 |
| 5,090,980 | 2/1992 | Clasen | 65/3.12 |
| 5,102,438 | 4/1992 | Newbould et al. | 65/3.12 |
| 5,127,929 | 7/1992 | Gunther et al. | 65/3.11 |
| 5,154,745 | 10/1992 | Le Sergent | 65/3.12 |

FOREIGN PATENT DOCUMENTS

| | | |
|---|---|---|
| 3040188 | 5/1981 | Fed. Rep. of Germany . |
| 2088486 | 1/1972 | France . |
| 2166385 | 8/1973 | France . |
| 2246507 | 5/1975 | France . |
| 2417478 | 9/1979 | France . |

*Primary Examiner*—Robert L. Lindsay
*Attorney, Agent, or Firm*—David, Bujold & Streck

[57] ABSTRACT

A method for producing an optical fibre which has been treated with titanium dioxide to improve its corrosion resistance includes stretching an assembly consisting of an outer sleeve having engaged therein a bar which is partially or entirely made of synthetic silica. When treating said fibre, the outside of the coupling sleeve is coated, prior to assembling the components, with a deposit of vitrified synthetic silica containing titanium dioxide.

6 Claims, 1 Drawing Sheet

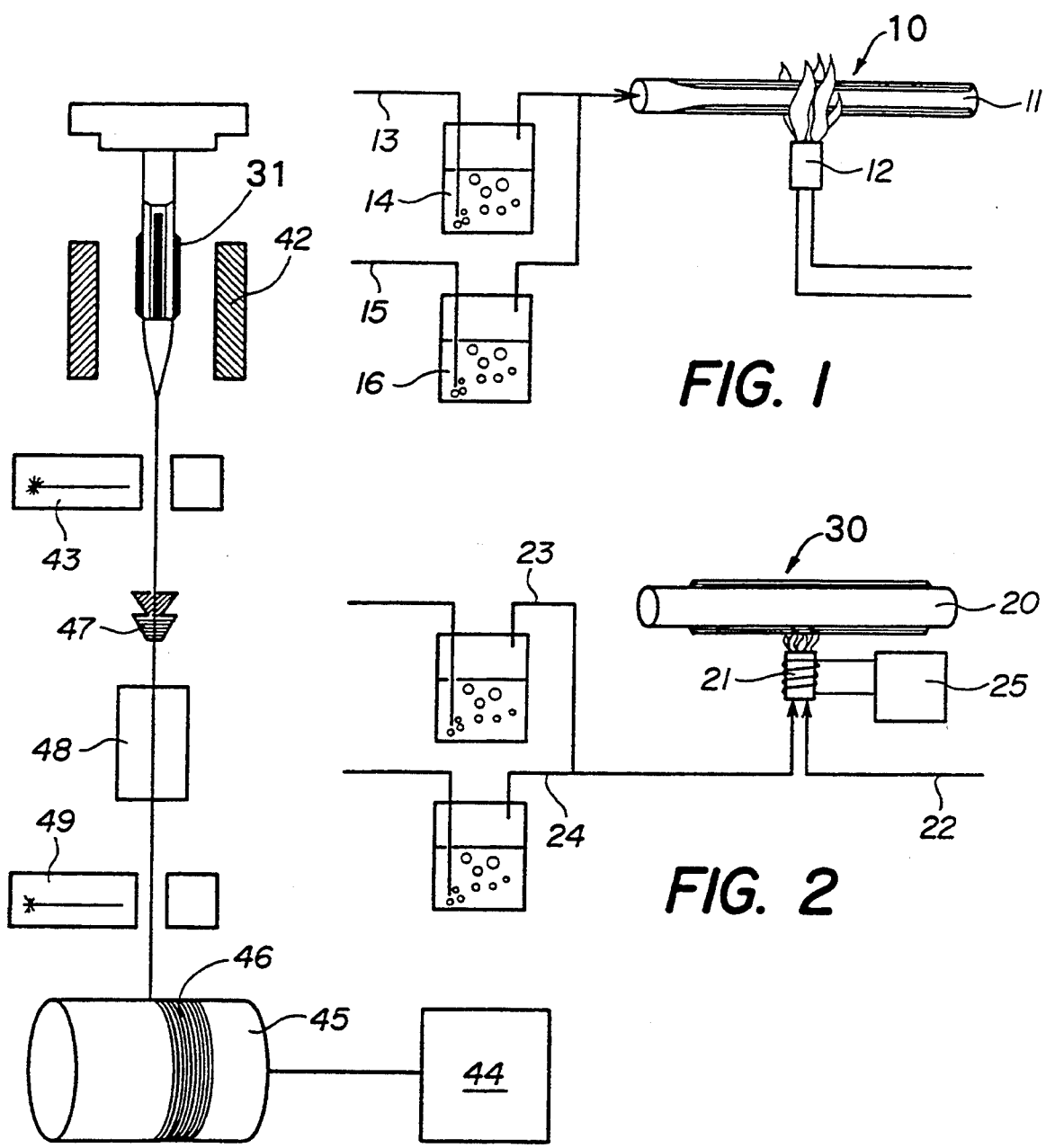
FIG. 1
FIG. 2
FIG. 4
FIG. 3

METHOD FOR PRODUCING AN OPTICAL FIBER

The present invention concerns a method for producing an optical fiber by stretching a heated assembly consisting of an outer sleeve which is partially or entirely made of synthetic silica with a bar engaged therein.

It also concerns an optical fiber made in accordance with this method.

It is known that doping the superficial layer of silica based optical fibers with titanium dioxide considerably increases the fiber's corrosion resistance when restrained. The parameter n, representing fiber susceptibility to corrosion derived from measurements of dynamic fatigue, can exceed 50, whereas it is approximately 20 for pure silica fibers.

One known doping procedure consists of covering non-vitrified preform by external deposition with supplemental deposition of silica, also non-vitrified, containing up to 20% molar proportion titanium dioxide. This preform then must be dried and vitrified before finally being stretched into an optical fiber over ten kilometers long and mechanically reinforced by doping it with superficial titanium dioxide.

Certain optical fibers, especially monomodal fibers, may be produced using methods which consist of depositing suitably doped silica inside a tube which is then held inside a bar, then engaging said bar inside an outer sleeve. This assembly constitutes a composite preform from which the optical fiber is produced by stretching it while hot.

This composite preform does not lend itself to doping with titanium dioxide as is done on mono-block preforms; as a result, up until now, it has not been possible to treat fibers produced by this process with titanium dioxide for improved corrosion resistance.

The aim of the present invention is to overcome this disadvantage.

This aim is achieved by the method of the invention, characterized in that before assembling the components, the outer sleeve is coated with a deposit of vitrified silica containing titanium dioxide.

According to a preferred embodiment said titanium dioxide is deposited in vapor phase using a plasma torch.

The titanium dioxide is preferably obtained by oxydizing a volatile or transportable component of titanium in the gas state in said plasma torch. This component may be a halogen such as titanium tetrachloride.

The titanium oxide is preferably deposited and vitrified at the same time as the silicon or silica oxide.

According to a preferred embodiment, the molar proportion of titanium dioxide is from 2 to 40% of the proportion of silica and preferably approximately equal to 10% of that proportion.

The present invention will be better understood with reference to the description of one preferred embodiment and to the attached drawing, in which:

FIG. 1 is a schematic illustration of the first, already known phase of the process consisting of making a standard preform according to the MCVD interior deposition method (Modified Chemical Vapor Deposition).

FIG. 2 shows a new phase which consists of doping an outer tubular sleeve with titanium dioxide with direct vitrification of the resulting deposit.

FIG. 3 shows the phase of assembling the standard preform restrained in a bar inside the sleeve, and FIG. 4 is a schematic illustration of the operation of stretching the composite assembly to form an optical fiber.

With reference to the drawings, first a component in the form of a bar (inner member) 10 is made from silica tube 11 which has been coated inside with synthetic silica before being compressed. A heat source 12 activates this interior deposition operation, which source may consist of an oxyhydrogen torch producing an interior tube temperature of approximately 1700° C., while a first oxygen current 13 which has been immersed in a silicon tetrachloride bath 14 and a second oxygen current 15 which has been immersed in a germanium tetrachloride bath 16 simultaneously pass through the tube. This process is known by the name MCVD (Modified Chemical Vapor Deposition). Said bar 10 may also be produced by vitrifying a cylinder consisting entirely of synthetic silica; in both cases, the synthetic silica is doped so it forms a guiding optical structure in the central (interior) bar portion.

The second phase of the process is shown in FIG. 2. This is a new phase which consists of depositing a vitrified layer of silica doped with titanium onto the outside surface of sleeve 20. Deposition takes place using a plasma torch 21 supplied with pure oxygen via conduit 22, with oxygen or argon charged with silicon tetrachloride via conduit 23, and also with oxygen or argon charged with titanium tetrachloride via conduit 24. As is known in the art, the plasma torch is associated with a high frequency generator 25. This phase of the procedure results in the production of a sleeve 30 having its outside surface doped with titanium dioxide.

As shown in FIG. 3, bar 10 and sleeve 30 are assembled to form a composite preform 31 serving as the primary material during the phase of stretching and forming fibers.

The stretching phase is shown schematically in FIG. 4. The stretching device comprises a rotatable element for stretching to which are attached the composite preform 31 and a heating unit 42 to raise the preform temperature to approximately 2200° C. A first fiber diameter measurement device 43 transmits data to a motor 44 driving a drum 45 which takes up the optical fiber 46 and regulates drum rotation speed to maintain the fiber diameter within the prescribed norms.

Another device 47 deposits acrylics on the peripheral surface of the fiber in formation. There is an ultraviolet radiation station 48 for polymerizing the acrylics.

A second measurement device 49 controls both fiber diameter and the acrylic coating process.

The present invention is not limited to the embodiments described but may undergo various modifications and assume other forms obvious to one skilled in the art.

We claim:

1. A method for producing an optical fiber having a superficial layer of vitrified silica containing titanium dioxide, said method comprising the steps of:
    forming an inner member (10) made at least partially of synthetic silica;
    employing an outer tube (20) of silica, and coating an exterior surface of said outer tube (20) with a deposit of vitrified silicon oxide containing titanium dioxide thereby to form an exterior coated outer sleeve (30);
    assembling said inner member within said outer sleeve thereby to form a composite preform; and heating and stretching said composite preform to form said optical fiber.

2. A method according to claim 1, further comprising the steps of heating said outer sleeve with a plasma torch (21) and depositing said titanium dioxide, in a vapor phase, on said outer sleeve.

3. A method according to claim 2, wherein the step of depositing said titanium dioxide comprises oxidizing at least one of a volatile and a transportable component of titanium, in a gas state, in said plasma torch.

4. A method according to claim 2, wherein the step of depositing said titanium dioxide comprises depositing and vitrifying said titanium dioxide at the same time as said silicon oxide.

5. A method according to claim 4, wherein the molar proportion of said titanium dioxide to said silicon oxide is between 2% and 40%.

6. A method according to claim 5, wherein the molar proportion of said titanium dioxide to said silicon oxide is approximately 10%.

* * * * *